Patented Dec. 29, 1942

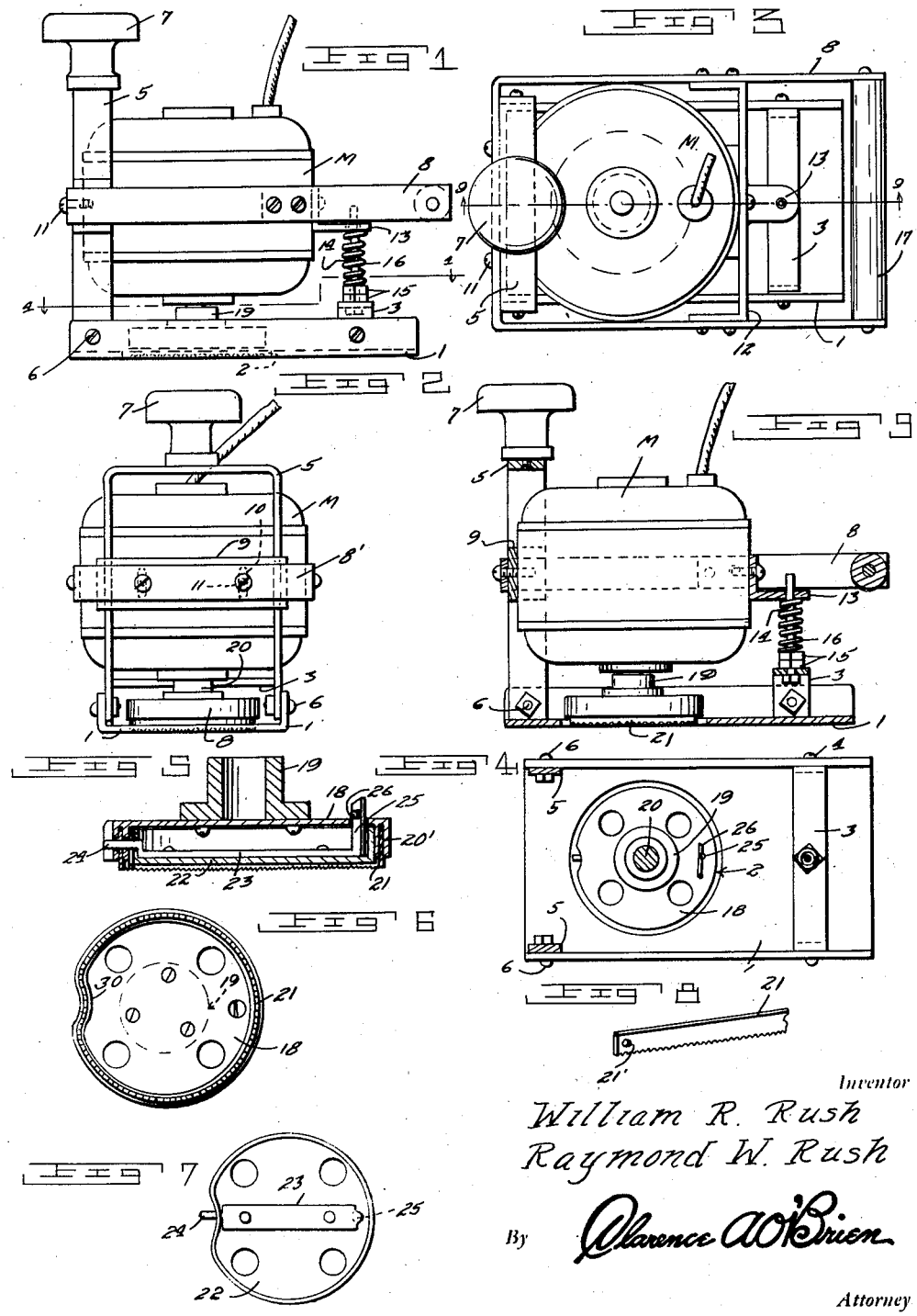

2,306,470

UNITED STATES PATENT OFFICE 2,306,470

RESURFACING MACHINE

William R. Rush and Raymond W. Rush, Mulberry, Kans.

Application February 7, 1941, Serial No. 377,932

2 Claims. (Cl. 144—2)

This invention relates to a resurfacing machine, mainly designed for resurfacing meat blocks, etc., the general object of the invention being to provide a frame supporting a motor which drives the cutting member with means for adjusting the part of the frame carrying the motor so as to bring the cutting member into contact with the surface with the desired amount of pressure.

Another object of the invention is to provide means for adjusting the motor carrying part of the frame to centralize the cutting member and also to provide means whereby the cutting member is removably attached to the motor driven cutter head so that the cutting member can be removed and replaced by a new one or the old one sharpened and replaced.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevational view of the invention.

Figure 2 is a rear view of the invention.

Figure 3 is a top plan view of the invention.

Figure 4 is a section on the line 4—4 of Figure 1.

Figure 5 is a vertical sectional view through the cutter head showing the means for removably holding the cutting member in place in the head.

Figure 6 is a bottom plan view of the stationary part of the cutting head with the cutting member therein.

Figure 7 is a bottom plan view of the movable part of the cutting head with the latch means for holding the cutter member in the head.

Figure 8 is a view of part of the cutting member which as shown as a flexible saw blade.

Fig. 9 is a vertical longitudinal sectional view of Fig. 3.

In these views the numeral 1 indicates the base frame which is of channel shape in cross section and which is provided with a large circular opening 2 in its bottom through which the cutting assembly extends and a cross member 3 extends across the front portion of the frame and is suitably attached thereto such as by means of the screws 4 passing through the flanges of the frame and into the downwardly bent ends of the cross member. A vertical frame 5 of inverted U-shape has the ends of its limbs pivoted to the rear ends of the flanges of the frame 1 by the bolts 6 and a knob 7 is connected to the central portion of the bight of the frame 5 so that this frame can be rocked manually on the pivots 6. A rectangular motor supporting frame 8 has its rear end member 8' adjustably connected to a cross bar 9 extending across an intermediate part of the frame 5, such adjusting means including the vertical slots 10 in the bar 9 for receiving the bolts 11 carried by the member 8'. The motor M is vertically arranged in the frame 8 and suitably connected thereto and a cross bar 12 passes across the frame 8 intermediate the ends thereof and has a lug 13 projected forwardly therefrom which is perforated to receive the upper end of a bolt 14 which is attached to the cross member 3 by the nuts 15 as shown in Figure 1. A spring 16 encircles the bolt and has one end resting against one of the nuts 15 and its other end against the lug 13 so that this spring tends to yieldingly hold the motor carrying frame 8 in raised position. The front end of the frame 8 is formed by a circular handle forming member 17 so that by grasping this member the frame 8 can be swung downwardly to cause the member 5 to pivot on the pivots 6 so as to lower the motor. An inverted cup-shaped member 18 has a socket member 19 connected to its central portion and this member receives in a detachable manner the depending motor shaft 20. This cup-shaped member has an annular groove 20' in its rim for receiving the cutting blade 21 which is in the form of a saw blade with the toothed part projecting from the groove. An inner cup-shaped member 22 fits in the inverted cup-shaped member 18 and carries a latch bar 23 which has its end 24 adapted to pass through holes in the grooved rim and in the rim of member 22 and through a hole 21' in the blade so as to hold the blade in place. The other end of the member 23 extends upwardly as shown at 25 and passes through a hole in the cup-shaped member 18 where a notch in the upper end of the part 25 receives a spring latch 26 for detachably holding the parts together. The parts are distorted so as to provide the cam part 30 for holding a portion of the blade as curving inwardly as shown more particularly in Figure 6 so that the cutting action is increased as the cutter assembly is rotated by the motor.

Thus it will be seen that I have provided a simple form of cutting mechanism for resurfacing a member such as a meat block and the like with means whereby the cutting member can be caused to engage the surface with the desired amount of pressure by pressing upon the knob 7 and the handle 17 to move the motor downwardly against the action of the spring 16. Also, the motor carrying frame can be adjusted through means of the bolts 11 and the tension of the spring 16 can also be adjusted. Also, a band saw blade can be used as a cutting member as shown in Figure 8 and this blade can be easily removed for sharpening purposes or a new blade can be substituted for the old one and the latch assembly composed of the cup-shaped member 22 and the bar 23 with the latch spring 26 makes the blade easily removable when desired. To remove the blade from the groove of the cup-shaped member 18, the spring latch 26 is moved out of engagement with the notch in the upright part 25 of the bar 23 and then the upper end of the part 25 is pressed downwardly to press the adjacent portions of the cup member 22 downwardly and out of the member 18. Then the cup member 22 with the bar 23 is moved downwardly and to the right to withdraw the end 24 of the bar from the holes in the grooved rim of the member 18, the parts having a loose fit to enable this withdrawal action. Then the band 21 can be withdrawn from the groove.

It is thought from the foregoing description that the advantages and novel features of the invention will be readily apparent.

It is to be understood that changes may be made in the construction and in the combination and arrangement of the several parts provided that such changes fall within the scope of the claims.

Having described the invention, what is claimed as new is:

1. A resurfacing machine comprising a base frame having an opening therein, a vertically arranged frame pivoted at its lower end to one end of the base frame, a horizontally arranged motor carrying frame fastened at one end to an intermediate part of the vertical frame, a motor carried by the horizontal frame and having its shaft extending downwardly, a cutter head connected with the shaft and passing through the hole in the base frame, means for yieldingly holding the horizontal frame in raised position and a handle for moving the vertical frame and the horizontal frame downwardly to bring the cutter head against a surface on which the device rests.

2. A resurfacing machine comprising a base frame having an opening therein, a vertical frame pivotally connected at its lower end to one end of the base frame, a horizontal frame adjustably connected at one end to an intermediate part of the vertical frame, a guide member carried by the front portion of the base frame and passing through a hole in the front part of the horizontal frame, a spring on the guide member engaging a part of the horizontal frame for holding the same upwardly, a handle connected with the front end of the horizontal frame, a motor carried by the horizontal frame and having its shaft extending downwardly and a cutter head connected with the shaft and passing through the hole in the base frame.

RAYMOND W. RUSH.
WILLIAM R. RUSH.